G. STICKNEY.
COW TAIL HOLDER.
No. 170,127. Patented Nov. 16, 1875.
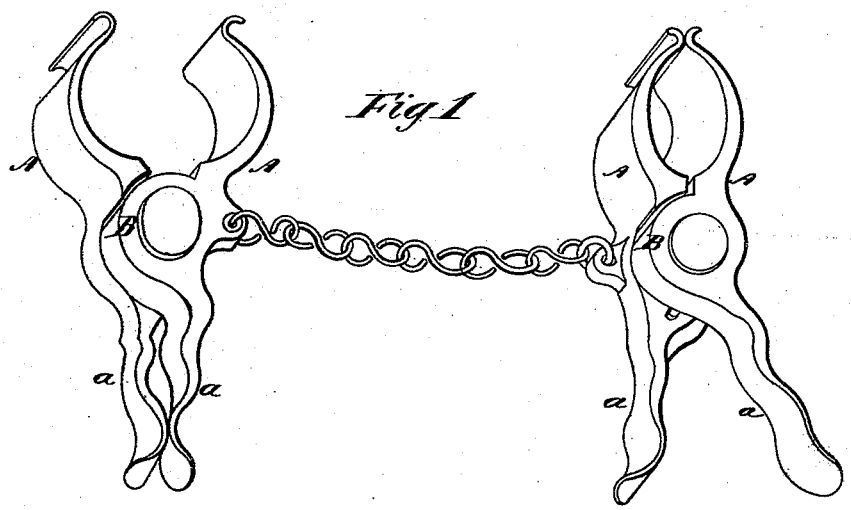

UNITED STATES PATENT OFFICE.

GAGE STICKNEY, OF PHILADELPHIA, PENNSYLVANIA.

IMPROVEMENT IN COW-TAIL HOLDERS.

Specification forming part of Letters Patent No. 170,127, dated November 16, 1875; application filed April 23, 1875.

*To all whom it may concern:*

Be it known that I, GAGE STICKNEY, of Philadelphia, in the county of Philadelphia and State of Pennsylvania, have invented certain new and useful Improvements in Shackles for Cows' Tails; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of the invention.

My invention has for its object to provide means for readily opening and closing, with one hand, the jaws of shackles for cows' tails.

The improvement consists in extending the jaws, back of their pivotal connection, so as to form handles, which may be grasped with one hand, and which, when compressed, will open the jaws.

A A represent the jaws, pivoted at B, having a spiral spring arranged in a suitable manner to cause the jaws to close automatically. These jaws have been heretofore opened by drawing them apart, inserting the fingers between them for that purpose, and when open were held distended by a bolt.

In my improvement the bolt is dispensed with, and the jaws are extended to form handles *a a*, which can be readily operated by one hand, either for application or removal.

What I claim as my invention is—

The improved shackles for cows' tails, consisting of the pinchers and connecting-chain, said pinchers having their jaws extended to form handles *a a*, for the purpose of more readily opening said jaws, substantially as described.

In testimony that I claim the foregoing I have hereunto set my hand.

GAGE STICKNEY.

Witnesses:
M. DANL. CONNOLLY,
CHAS. F. VAN HORN.